March 29, 1966 W. B. MORRIS ETAL 3,243,148
AIRCRAFT HORIZONTAL TAIL CONTROL MECHANISM
Filed Jan. 28, 1964 4 Sheets-Sheet 1
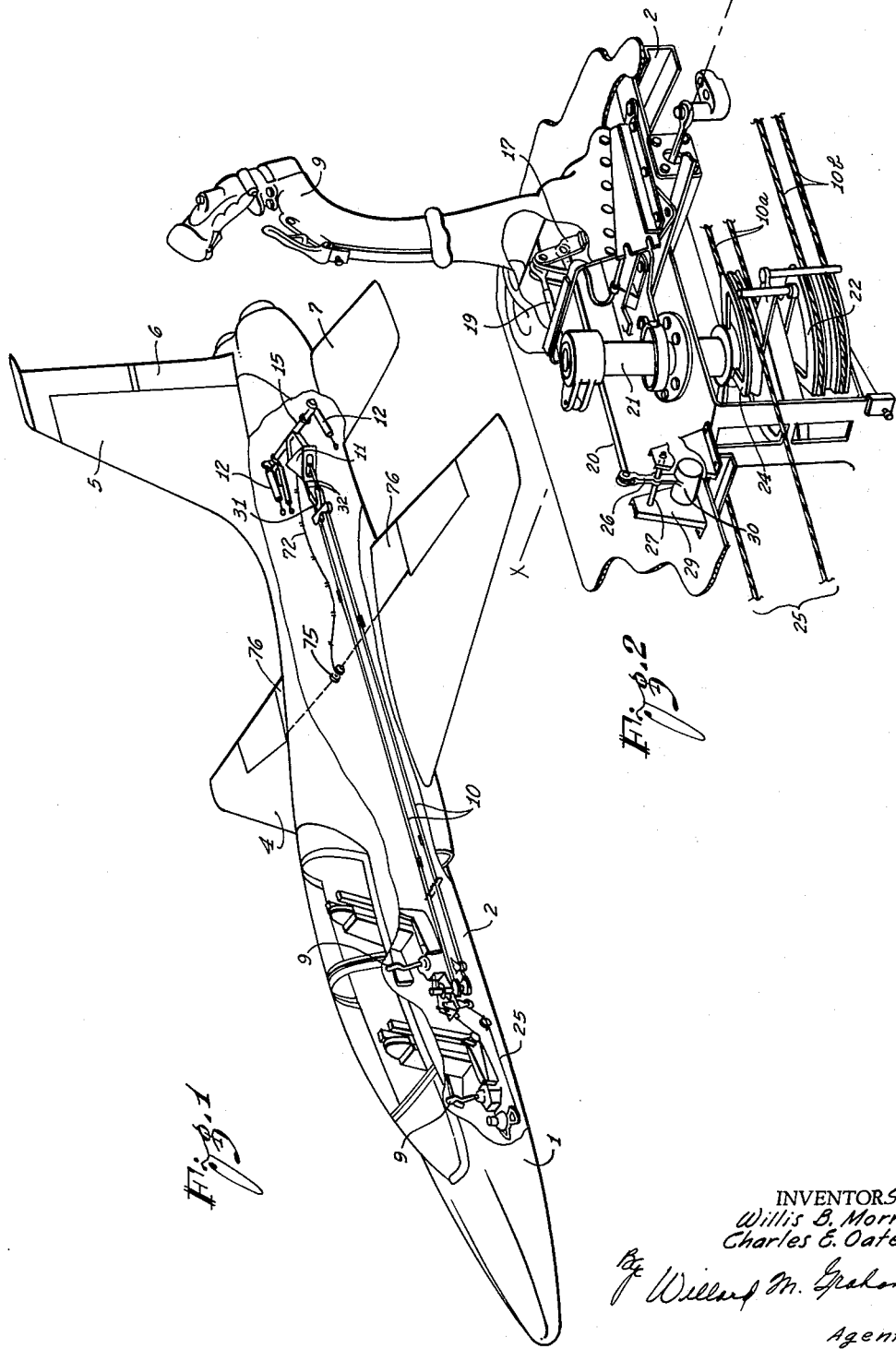
INVENTORS:
Willis B. Morris
Charles E. Oates
By Willard M. Graham
Agent March 29, 1966 W. B. MORRIS ETAL 3,243,148
AIRCRAFT HORIZONTAL TAIL CONTROL MECHANISM
Filed Jan. 28, 1964 4 Sheets-Sheet 2
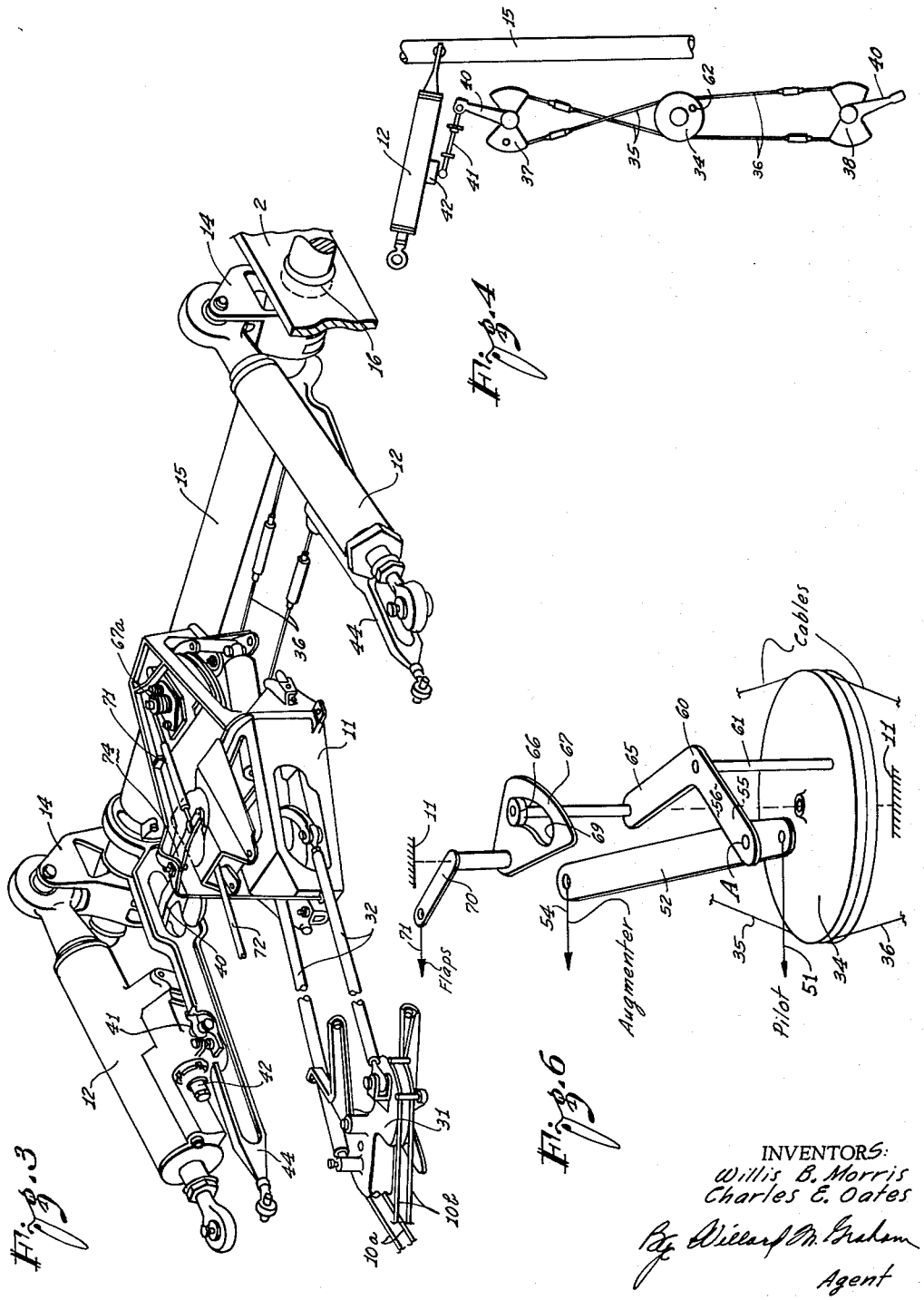
INVENTORS:
Willis B. Morris
Charles E. Oates
Agent

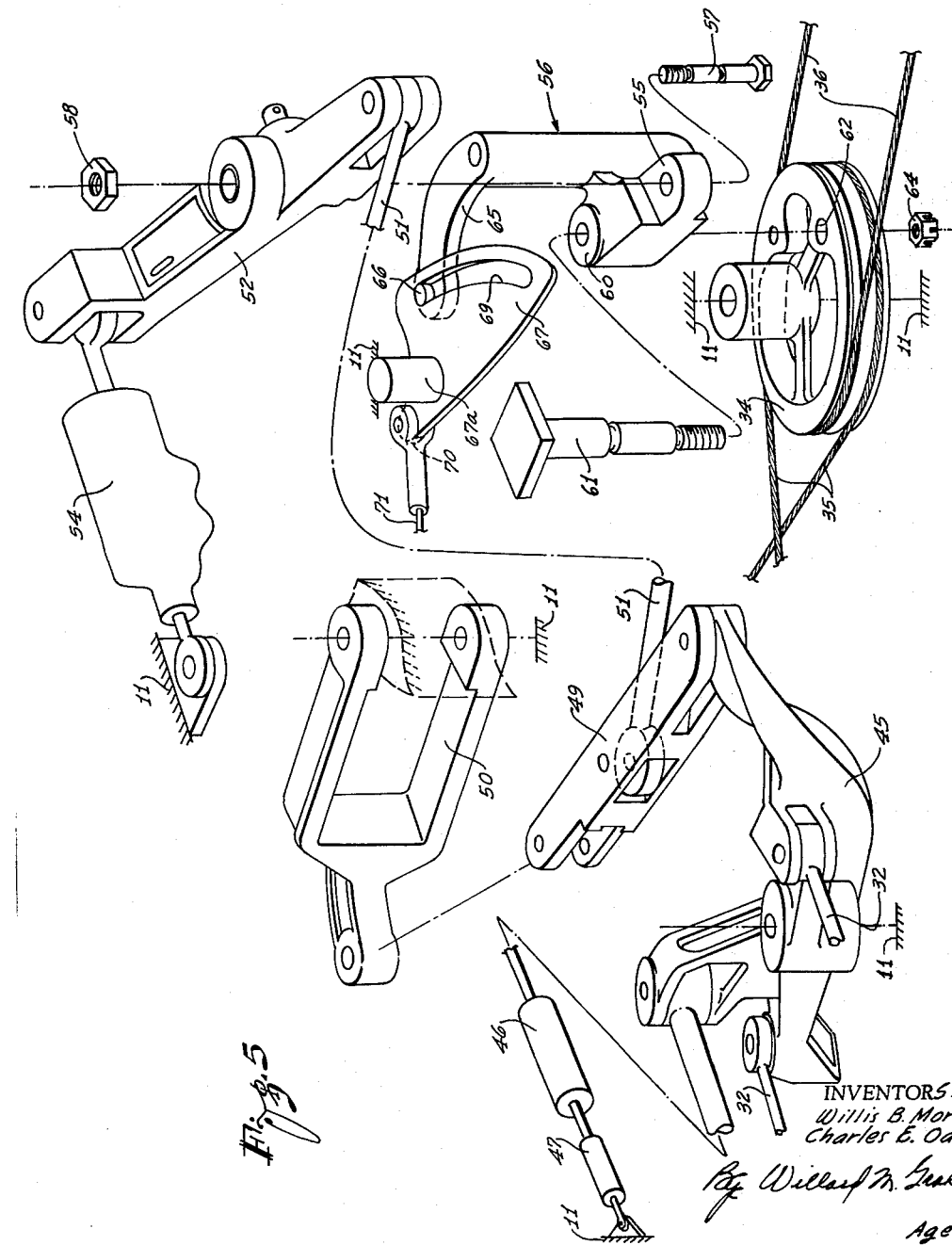

INVENTORS
Willis B. Morris
Charles E. Oates

By Willard M. Graham
Agent

United States Patent Office 3,243,148
Patented Mar. 29, 1966

3,243,148
AIRCRAFT HORIZONTAL TAIL CONTROL
MECHANISM
Willis B. Morris, Redondo Beach, and Charles E. Oates, Manhattan Beach, Calif., assignors to Northrop Corporation, Beverly Hills, Calif., a corporation of California
Filed Jan. 28, 1964, Ser. No. 340,612
9 Claims. (Cl. 244—83)

The present invention relates to aircraft, and more particularly, to a horizontal tail control system for a supersonic airplane.

Objects of this invention are to provide an airplane horizontal tail surface control mechanism incorporating motion ratio changing means, stability augmenting means, means producing artificial control stick feedback force responsive to vertical load factor, and provisions for an independent control input from the wing flaps of the airplane, together with control stick centering means so arranged that the inputs to the horizontal tail actuators from the stability augmenter and from the wing flap system cannot be felt by the pilot back through the control stick.

Briefly, our invention comprises a certain arrangement and combination of elements connected between the pilot's control stick and the control valves of hydraulically operated horizontal tail surface actuators, and other elements connected to this system. A cable system, for example, connects the control stick to an elastic stick centering means and also to a non-linear motion ratio changing linkage. The latter linkage then connects to one input point of a walking beam which forms part of a motion mixing mechanism. A suitability augmenter is connected to another input point of the walking beam. An output point of this beam connects through a variable position differential means to an output member. Another input to the differential means has a driven interconnection from the wing flaps of the airplane. A bobweight is also connected by linkage to the control stick, for producing the desired stick force relationship in accordance with vertical load factor (in gravitational units "g") acting upon the airplane.

The details and essential operation of this system will be fully disclosed in the description of an actual embodiment thereof to follow. For purposes of illustration, the detail description will refer to the accompanying drawings, wherein:

FIGURE 1 is a perspective view of an airplane showing the overall layout of the horizontal tail control system.

FIGURE 2 is a perspective view, partly cut away, of one control stick installation, showing control cables and bobweight assembly connected thereto.

FIGURE 3 is a perspective view of the aft section of the horizontal tail control system, showing the overall location of assemblies in this area, including the housing containing a major portion of the mechanism.

FIGURE 4 is a diagrammatic plan view of the output members of the system portion shown in FIGURE 3.

FIGURE 5 is a perspective break-away drawing showing the connections of members within the housing of FIGURE 3.

FIGURE 6 is a perspective diagram showing in schematic form the principle of operation of certain parts in FIGURE 5.

Figure 7:
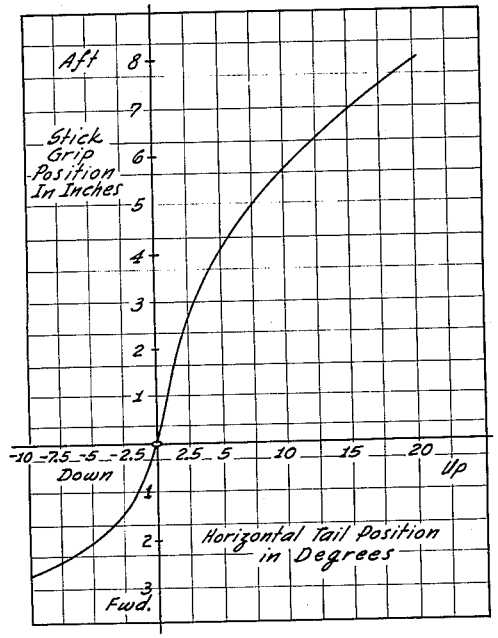
FIGURE 7 is a graph showing the relationship of control stick position versus horizontal tail position.

Referring first to FIGURE 1 for a description of a specific apparatus, a two-place supersonic airplane 1 has a fuselage 2, wing 4, vertical tail 5 with movable rudder 6, and an all-movable horizontal tail control surface hereinafter referred to as the horizontal stabilizer 7. Each crew position has an operator's control stick 9 interconnected for simultaneous movement in the conventional manner. Two sets of cables 10 lead from the control sticks 9 through the fuselage 2 to a horizontal tail mechanism housing 11. The mechanism controls the simultaneous operation of two hydraulic actuators 12 pivotally fixed to the fuselage structure at their forward piston rod ends and pivotally connected to horns 14 (FIGURE 3) at their rear cylinder casing ends. Horns 14 are fixed to a horizontal torque tube 15 rotatably mounted in support bearings 16 (FIGURE 3) in the fuselage 2. The respective ends of the torque tube 15 are fixed to the left and right halves of the horizontal stabilizer 7. Thus, rotation of the torque tube 15 by the actuators 12 causes the stabilizer 7 to pivot up or down in pitch-controlling movements on the airplane 1.

The rear cockpit control stick 9 is shown more fully in FIGURE 2. Here, the stick 9 is mounted for fore-and-aft rotation about an axis X—X for movement of the horizontal stabilizer 7 in the usual direction to achieve pitch attitude. A bracket 17 effectively fixed to the stick 9 above axis X—X carries a pivotal connection for a stabilizer control rod 19 and for a bobweight rod 20. Stabilizer rod 19 rotates a vertical column 21 to the lower end of which a control quadrant 22 is fixed. Running aft from control quadrant 22 are two pairs of cables 10a and 10b to the remainder of the stabilizer mechanism. An additional cable quadrant 24 is also fixed to column 21 and carries another set of interconnection cables 25 forward to the front cockpit control stick.

Bobweight rod 20 connects at its forward end to a substantially vertical arm 26 mounted for rotation about an axle 27 fixed in a standard 29. A bobweight 30 is attached to the lower end of arm 26 beneath the axle. Operation of the bobweight 30 will be described with the operation of the entire system near the end of this specification.

Referring now to FIGURE 3, the cables 10a and 10b fasten around a rear quadrant 31 rotatable about a central axis toward the rear of the fuselage 2. A pair of opposed push-pull rods 32 are removably bolted to opposite sides of rear quadrant 31 and lead further rearward to the mechanism enclosed in housing 11. Bypassing the details of this mechanism for the time being, a rotatable output pulley 34 (FIGURE 4) is rotated by movement of the push-pull rods 32. Transverse cables 35 and 36 extend laterally from dual grooves in output pulley 34 to rotatable side quadrants 37 and 38. A valve actuating lever 40 fixed to each side quadrant 37 and 38 is pivotally connected to the rear of respective valve operating rods 41. The forward ends of rods 41 enter respective control valves 42 attached to their associated driven actuators 12. Conventional hydraulic supply and return lines (not shown) are connected to each valve 42 to operate the actuators 12. Additional support and bracing for torque tube 15 is provided by fixed support links 44 on each side of the airplane.

Attention is now directed to FIGURES 5 and 6 for description of the main portion of the mechanism of the present invention. FIGURE 5 shows substantially actual shapes of the various elements, with their connections and respective alignment positions being shown by dot-dash lines and by extended center-lines. The housing 11 is omitted and represented by a fixed structure symbol. FIGURE 6 shows a portion of the mechanism in schematic form only, to illustrate and clarify the principles of operation of the compound linkages.

Starting at the forward end of housing 11, the push-pull rods 32 are pivotally connected at their rear ends to opposite sides of a bellcrank 45 rotatably mounted about a central axis fixed in the housing 11. The right end of bellcrank 45 is further pivotally connected at a right angle to an elastic centering device 46 which may take any suitable form, such as a two-way spring-loaded cartridge for example. The centering device 46 is in turn connected in line to a variable-length trim actuator 47 which is then pivotally connected to the housing 11 or to other fixed structure. This series connection of centering device 46 and trim actuator 47 provides centering forces to the control stick 9, and the operation is equivalent if the positions of the centering device 46 and trim actuator 47 are interchanged.

The left end of bellcrank 45 is further pivotally connected to one end of a cross-link 49, the other end of which is pivotally connected to one end of a fork idler 50. The fork end of idler 50 is pivotally connected to housing 11 at a desired location approximately straight to the rear of the left end of bellcrank 45. A drive rod 51 is pivotally connected to the center of cross-link 49 and extends toward the rear and left, through the clearance space of the fork idler 50, to connect to the left end of a walking beam 52.

Walking beam 52 extends generally laterally of the airplane, and its right end is pivotally connected at approximately 90 degrees to a stability augmenter 54 having its far end pivotally attached to housing 11. The stability augmenter 54 is extendable and retractable in accordance with signals from a longitudinal stability augmenter system (not shown) to maintain stability automatically without pilot control movements, as is well known in the art. Such a system is fully disclosed, for example, in the U.S. Patent 2,958,483 to McRuer et al., for a Longitudinal Stability Augmenter. The augmenter 54 thus pushes or pulls on the right end of walking beam 52 to control horizontal stabilizer movement, while the drive rod 51 pushes or pulls on the left end of walking beam 52 to transmit pilot-controlled movements to the horizontal stabilizer 7.

At a point on walking beam 52 near the left end, a first projection 55 of a connecting crank 56 is pivotally connected, by means of a bolt 57 and nut 58. This first projection 55 fits on the bottom side of the walking beam 52, as shown, and lubricated bearing means (not shown) is preferably utilized at this connection. A second projection 60 of connecting crank 56 is fitted with a special bolt 61 which pivotally connects to the output pulley 34 through an aperture 62 near the left-hand rim thereof. Another nut 64 and bearing means (not shown) are preferably used at this pivotal connection. It is seen that the second projection 60 of connecting crank 56 fits on the upper side of output pulley 34.

Since output pulley 34 is rotatably mounted in and supported by the housing 11, it is seen that this pulley 34 actually supports the connecting crank 56, the walking beam 52, one end of the stability augmenter 54, and one end of the drive rod 51.

At the upper end of connecting crank 56, a cam follower arm 65 carries a cam follower roller 66 at its outer end. A cam plate 67 is rotatably mounted on bearing means 67a in an upper portion of housing 11, and a curved cam slot 69 in this plate 67 is designed to fit over the roller 66 and guide the same therein. Thus, as the cam plate 67 is rotated, the roller 66 is forced by the sides of slot 69 to exert a turning moment at the end of follower arm 65 and so rotate or pivot the connecting crank 56 about its connection with the walking beam 52.

Cam plate 67 carries an integral finger 70 extending on the right-hand side thereof, to which is pivotally connected a flap interconnecting rod 71 extending forward in the fuselage 2. As shown in FIGURE 3, the latter rod 71 is driven by a flap extension rod 72 through the medium of an idler lever 74 pivotally mounted on housing 11. As further indicated in FIGURE 1, the flap extension rod 72 comes from a flap driven member 75 which is driven by a wing flap control system (not shown) when it is desired to operate a pair of lift flaps 76 on the trailing edge of the airplane wing 4.

In the present system as illustrated, when the wing flaps 76 are in their retracted position for normal flight, the cam plate 67 is in such a position that the extended vertical centerline of the cam follower roller 66 is coincident with the fixed axis of rotation of the output pulley 34, as indicated in FIGURE 6. Therefore, it will be seen that as long as the wing flaps 76 are stationary, the outer end of the follower arm 65 acts as a fixed pivot point for rotation of the connecting crank 56 when moved by the walking beam 52.

It will now be evident that there are three input motion connections to the horizontal stabilizer control system and one output motion therefrom. The three input connections are (1) from the pilot's control stick via the drive rod 51 to the walking beam 52, (2) from the stability augmenter 54 to the walking beam 52, and (3) from the flap interconnecting rod 71 via the cam plate 67 to the connecting crank 56. The one output is obviously the driving of the output pulley 34 via the beforementioned pivotal connection (bolt 61) from the connecting crank 56. The centerline of the crank connection at projection 60 is preferably closer to the pivotal connection at projection 55 than to that of the cam follower roller 66. When the control stick 9 alone is moved, for example, the drive rod 51 pivots the walking beam 52 around its right end connection (referring to the airplane directions) to the stability augmenter 54, which pivots the connecting crank 56 about the axis of its follower roller 66, and thus rotates the output pulley 34 by means of its connection with the second projection 60 of the connecting crank 56. It has already been described how rotation of output pulley 34 causes deflection of the horizontal stabilizer 7 by operation of the hydraulic actuators 12. When the stability augmenter 54 alone is moved, this pivots the walking beam 52 around its left end connection to the drive rod 51, which pivots the connecting crank 56 about the follower roller 66 again, and thereby moves the output pulley 34. Lastly, when the wing flaps 76 alone are moved, this pivots the connecting crank 56 about its connection to the walking beam 52 and thus rotates the output pulley 34.

Several operational features of this mechanism will now be pointed out. The "scissors" linkage composed of bellcrank 45, cross-link 49, fork idler 50, and connection of drive rod 51 to a midpoint of cross-link 49, forms a motion ratio changer which results in a relation as shown in FIGURE 7. Around the neutral position of control stick 9, a given movement thereof causes relatively little deflection of the horizontal stabilizer 7. Farther from neutral, the graph shows that the stabilizer 7 moves more for each given increment of control stick motion. This is because it is desired to have a generally linear airplane response to control stick movement, and the fact that the stabilizer 7 is more effective near neutral than near its extreme positions.

The overall "gear ratio" of force from the control stick 9 to the actuator valves 42 is in the neighborhood of 1:10 or 1:15. This ratio, together with the elastic stick centering device 46 being located nearer to the control stick 9 than is the mechanism in housing 11, provides a "back-up" for the stability augmenter 54 and for the wing flap input interconnection when they are actuated. That is, the non-linear gearing, plus what small friction exists in the movable parts of the control system, prevents the pilot from feeling any reaction (at the control stick) to stability augmenter motion or to horizontal stabilizer movements caused by the wing flap interconnection input.

For instance, suppose that five pounds of force is required to be provided at the walking beam connection to the connecting crank 56 (point A in FIGURE 6) in order to move the hydraulic control valves 42. This force is higher than required in actual service but is cited for discussion only. Now, since point A is actually located about one-fifth of the distance from the left end of walking beam 52 to the right end thereof, one pound of the five is reflected back to the stability augmenter 54 and four pounds is reflected back to the drive rod 51. Passing through the non-linear gearing of the scissors linkage mentioned above, and using the 1:10 ratio, this four pounds becomes four-tenths pound at the control quadrant 22 (FIGURE 2) near the pilot's control stick 9. The friction force from control quadrant 22 through cables, pulleys, etc., to the control stick 9 itself is greater than one pound. Therefore, the four-tenths pound back-up force never reaches the pilot, and he cannot feel it at all. In other words, his control stick 9 would not even tend to move due to this back-up force.

When the wing flaps 76 are lowered, the flap interconnecting rod 71 is pulled forward and moves the cam follower roller 66 rearward, thus rotating the output pulley 34 counter-clockwise as viewed from above. This is in the proper direction to lower the trailing edge of the horizontal stabilizer 7 and compensate for a slight nose-up attitude which the lowered flaps would cause by themselves in certain airplanes.

Figure 8:
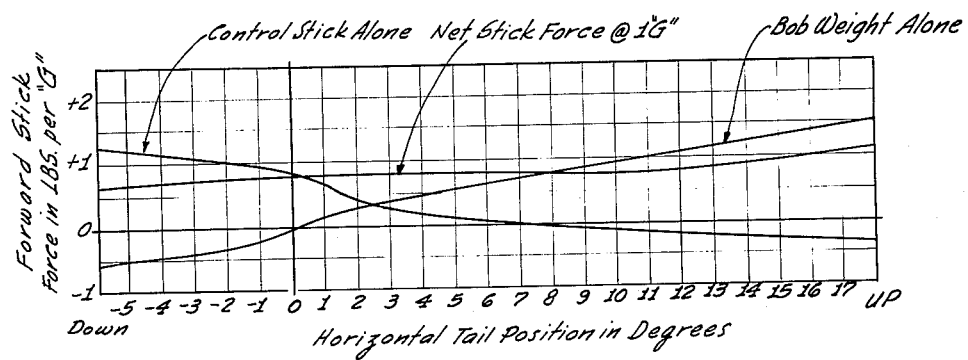
FIGURE 8 is a graph showing the relationship of components of control stick feedback force that vary with vertical acceleration versus horizontal tail position.

To shape the output for a nearly constant stick force per "g" the bobweight 30 of FIGURE 2 is provided. In the neutral position of the control stick 9, the moment of force of bobweight 30 on the control stick 9 is essentially zero. When the stick 9 is back, i.e., airplane accelerating upwardly, it is seen that bobweight 30 produces a forward pull on the control stick 9 proportional to vertical acceleration ($g$). The amount of this force is shown in FIGURE 8 by the curve labeled, "Bob Weight Alone." Similarly, when the stick 9 is forward of neutral under a positive $g$ load condition, the bobweight 30 causes a rearward push on control stick 9.

Also, it will be noted that in the present case, the control stick 9 configuration wherein its center of gravity is forward of the pivot axis X—X at neutral stick position), causes the control stick 9 itself to act as a bobweight. The amount of this effect is shown by the curve labeled, "Control Stick Alone," in FIGURE 8. Of course, the moment of force of the bobweight 30 and control stick 9 combine to result in the curve labeled, "Net Stick Force at 1G." It is seen that this curve is nearly a constant amplitude, meaning that the overall stick force per $g$ is substantially constant throughout the range of motion of the horizontal tail. The elastic centering device 46 of course produces a final gross centering force on the control stick 9, but this force is essentially linear with stick position on either side of neutral, as is the usual custom. Trimming to a new neutral stick position is accomplished by changing the length of the trim actuator 47 as desired.

The drive rod 51 may be replaced by a preloaded elastic overload member or bungee, which is normally a solid link but designed to "give" in either direction at a predetermined tension or compression load therein. The preload force may be 50 pounds, for example. At the hand grip on the control stick 9, this amounts to approximately two and one-half pounds. Under certain conditions of very rapid load reversals on the control system when the actuator valves 42 are wide open and the stabilizer 7 is actually not keeping up with movements of the controls, this bungee will come into play and prevent damage to the system through excessive loads. In cases of certain emergencies caused by malfunction, the bungee again will operate as a safety device.

Summarizing, the present invention in the control mixing mechanism is seen to consist of two differential units connecting all the control inputs in series with each other and with the output, i.e., the moving of the actuators 12. First, the pilot-controlled movements through the drive rod 51 and the stability augmenter 54 movements are added or subtracted at the walking beam 52 to give a resulting output to the connecting crank 56. Next, this resulting walking beam output and the input movement from the wing flap system through cam plate 67 are added or subtracted at the connecting crank 56 to give a final output motion to the output pulley 34. From the drive rod 51 to the stabilizer actuators 12, the pilot-controlled motion is substantially a linear function of the amount of movement, when the wing flaps 76 are up.

It is thus seen that a horizontal tail control mechanism has been provided which fulfills all the before-enumerated objects and is adaptable to the peculiar characteristics of any high speed, high performance airplane. For this reason, it is obvious that almost endless variations are possible in the geometry and form of any one particular embodiment while still retaining and utilizing the principles taught herein, and without departing from the essentials of the present invention.

The stability augmenter 54 and the wing flap interconnection at cam plate 67 are typical units or inputs which can be attached as described. However, other auxiliary inputs can be used instead, such as an auto-pilot, for example, an interconnection from the landing gear if required, or from an airspeed or altitude-sensitive system, or the like, whether manually or automatically controlled; in short, any system or mechanism for which it is desired to have an independent control of the horizontal tail surface. Of course, the same teachings can also be applied to the rudder or aileron control systems if desired.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

We claim:

1. In an airplane having a pilot's manual control element and a movable surface control member; a control mechanism comprising:
    (1) motion transmitting means connected to the pilot's control element;
    (2) automatic non-linear motion ratio changing means connected to said transmitting means;
    (3) differential means having two motion inputs and one motion output, a first one of said inputs connected to said ratio changing means;
    (4) auxiliary surface control means connected to the second input of said differential means; and
    (5) operative connecting means between the output of said differential means and the surface control member.

2. Apparatus in accordance with claim 1 including elastic control element centering means connected from a normally stable back-up point on the framework of said airplane to said motion transmitting means at a point between the pilot's control element and said motion ratio changing means.

3. Apparatus in accordance with claim 1 including bobweight means effectively connected to the pilot's control element to give a substantially constant force per $g$ on the element throughout the range of operation thereof.

4. Apparatus in accordance with claim 1 wherein said differential means comprises a walking beam having said ratio changing means and said auxiliary control means connected at opposite ends thereof, said differential means output being at a point on said walking beam near the end at which said ratio changing means is connected.

5. Apparatus in accordance with claim 1 wherein said motion ratio changing means comprises means for producing a gradually greater surface control member movement per increment of pilot's control element movement away from neutral on each side of the neutral position of said pilot's control element.

6. Apparatus in accordance with claim 1 wherein said auxiliary surface control means comprises a stability augmenter.

7. Apparatus in accordance with claim 1 wherein said connecting means comprises a second differential means having two motion inputs and one motion output, a first one of said latter inputs connected to the output of the first said differential means, a second auxiliary surface control means connected to the second of said latter inputs, and the output of said second differential means operatively connected to the surface control member.

8. In an airplane having a pilot's manual control element and a movable surface control member, a control mechanism comprising:
   (1) motion transmitting means connected to the pilot's control element;
   (2) motion ratio changing means connected to said transmitting means;
   (3) first differential means having two motion inputs and one motion output, a first one of said inputs connected to said ratio changing means;
   (4) first auxiliary surface control means connected to the second input of said first differential means;
   (5) operative connecting means between the output of said first differential means and the surface control member;
   (6) wherein said connecting means comprises a second differential means having two motion inputs and one motion output, a first one of said latter inputs connected to the output of said first differential means, a second auxiliary surface control means connected to the second of said latter inputs, and the output of said second differential means operatively connected to the surface control member;
   (7) wherein said second differential means comprises a crank member having said first differential means output and said second auxiliary surface control means connected at opposite ends thereof, said second differential means output being from a point on said crank near the end at which said first differential means output is connected; and
   (8) wherein said connecting means further comprises a rotatable member to which said second differential means output point is drivingly connected, said end of said crank to which said second auxiliary surface control means is connected having an axis which is coaxially aligned with the axis of rotation of said rotatable member in one position of said second auxiliary surface control means.

9. In an airplane having a pilot's manual control element and a movable surface control member, a control mechanism comprising:
   (1) motion transmitting means connected to the pilot's control element;
   (2) motion ratio changing means connected to said transmitting means;
   (3) first differential means having two motion inputs and one motion output, a first one of said inputs connected to said ratio changing means;
   (4) first auxiliary surface control means connected to the second input of said first differential means;
   (5) operative connecting means between the output of said first differential means and the surface control member;
   (6) wherein said connecting means comprises a second differential means having two motion inputs and one motion output, a first one of said latter inputs connected to the output of said first differential means, a second auxiliary surface control means connected to the second of said latter inputs, and the output of said second differential means operatively connected to the surface control member;
   (7) wherein said movable surface control member is a horizontal tail surface control member; and
   (8) wherein said second auxiliary surface control means comprises a wing flap control system having a driven member connected to said second differential means as recited.

References Cited by the Examiner

UNITED STATES PATENTS

| | | | |
|---|---|---|---|
| 2,191,842 | 2/1940 | Back. | |
| 2,275,692 | 3/1942 | Sims. | |
| 2,667,315 | 1/1954 | Watson et al. | 244—83 |
| 2,685,422 | 8/1954 | Hammond et al. | 244—83 |
| 2,903,205 | 9/1959 | Borngesser et al. | 244—83 |
| 2,940,696 | 6/1960 | Teague | 74—471 X |
| 2,940,697 | 6/1960 | Lawrence | 244—83 |
| 2,985,408 | 5/1961 | Johnson | 244—90 |
| 3,119,583 | 1/1964 | Gibson | 244—83 |
| 3,138,354 | 6/1964 | Baetke | 244—90 |

MILTON BUCHLER, *Primary Examiner.*

B. BELKIN, *Assistant Examiner.*